Feb. 4, 1964  C. S. BEARD ETAL  3,120,103
ELECTROHYDRAULIC CONTROL SYSTEM
Filed April 27, 1959  3 Sheets-Sheet 1

TEST SAMPLING

CHESTER S. BEARD
FRANK R. HEDGER
INVENTORS

BY Lyon+Lyon
ATTORNEYS

Feb. 4, 1964

C. S. BEARD ETAL 3,120,103

ELECTROHYDRAULIC CONTROL SYSTEM

Filed April 27, 1959

CHESTER S. BEARD
FRANK R. HEDGER
INVENTORS

BY Lyon+Lyon
ATTORNEYS

Feb. 4, 1964  C. S. BEARD ETAL  3,120,103
ELECTROHYDRAULIC CONTROL SYSTEM
Filed April 27, 1959  3 Sheets-Sheet 3

CHESTER S. BEARD
FRANK R. HEDGER
INVENTORS

BY Lyon & Lyon
ATTORNEYS

United States Patent Office 3,120,103
Patented Feb. 4, 1964

3,120,103
ELECTROHYDRAULIC CONTROL SYSTEM
Chester S. Beard, Hollywood, and Frank R. Hedger, Glendale, Calif., assignors to General Controls Co., Glendale, Calif., a corporation of California
Filed Apr. 27, 1959, Ser. No. 809,291
1 Claim. (Cl. 60—52)

The present invention relates to means and techniques applicable to a system for positioning a movable valve element in a valve casing.

In general, the present arrangement described herein includes a three-way valve having two movable valve elements cooperating with different valve ports with such movable valve elements being biased away from each other towards engagement with corresponding valve ports. A control system involving the use of a pair of fluid motors is used to move such valve elements relative to their valve ports; and one important feature of the invention is that when such control system is inoperative as, for example, by a power failure, the three-way valve is automatically closed.

An object of the present invention is to provide an improved valving arrangement having the features indicated above.

Another object of the present invention is to provide a valving system involving the use of a valve casing having two ports, each of which is controlled by a common valve stem, the arrangement being such that with both ports closed, one of the ports is opened by moving the stem in one direction, and the other port is opened by moving the stem in the opposite direction with the feature that both ports are closed when no force is applied to the operating stem.

Another object of the present invention is to provide an arrangement as indicated in the preceding paragraph characterized by the fact that the valve stem is controlled by a hydraulically operated control system involving the use of electrical means which, when de-energized as, for example, by power failure, allows the two valve ports to automatically close.

Another object of the present invention is to provide a valving system of this character which requires no calibrated spring and operates such that the entire pressure outlet of a pump is used in positioning of the valve stem.

Another object of the present invention is to provide a system of this character applicable to the positioning of butterfly valves and other valves which have a tendency to move from a desired position in response to unbalanced forces.

Another object of the present invention is to provide an improved valving system of this character in which a three-way valve is operated in a novel manner using two motor operated hydraulic systems for moving a valve stem in opposite directions.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings in which:

FIGURE 3 illustrates diagrammatically the structure illustrated in FIGURES 1 and 2.

Figure 3:
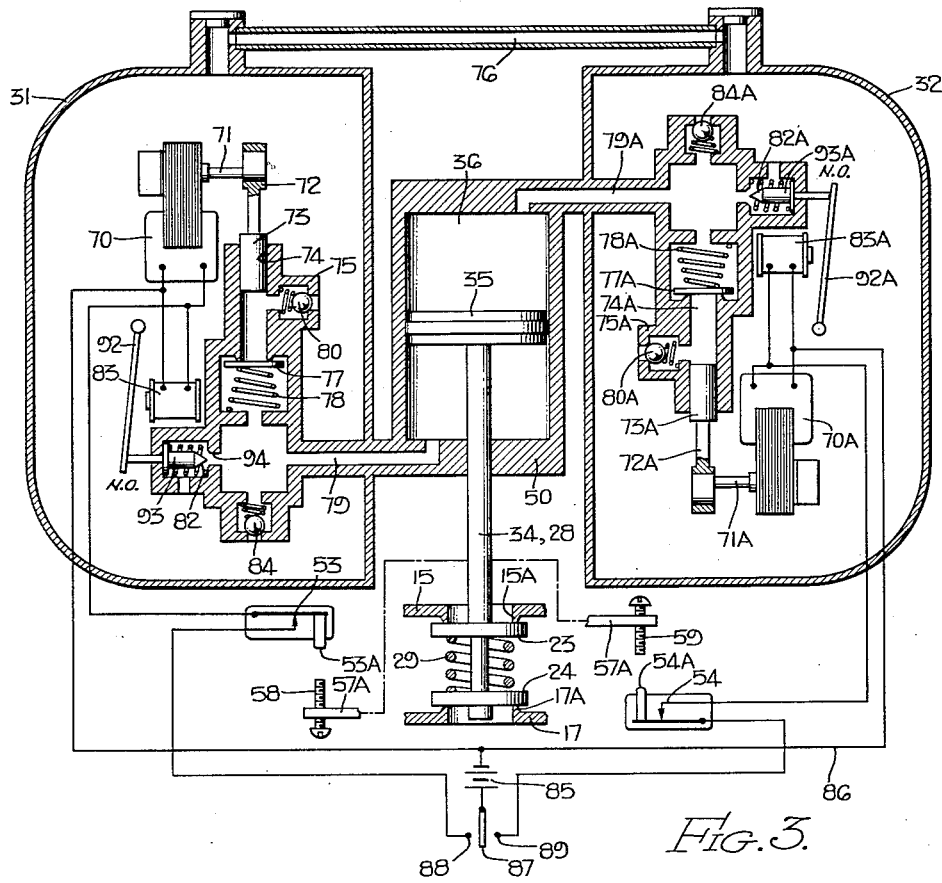
FIGURE 3 is a diagrammatic representation of a system embodying features of the present invention and more particularly
Figure 1:
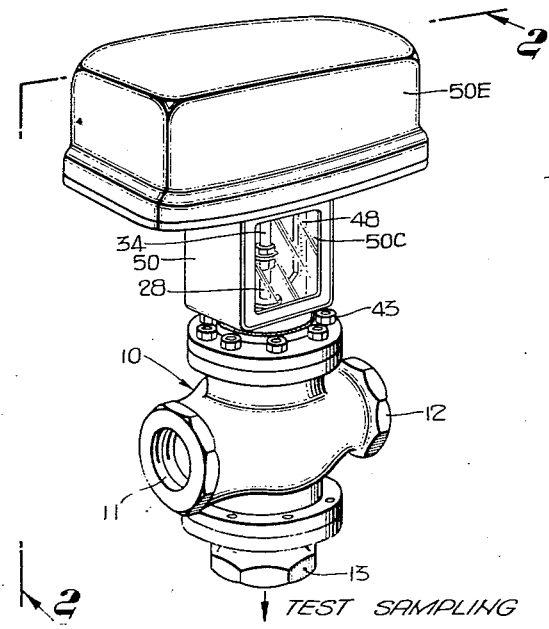
FIGURE 1 is a perspective view of a valve arrangement embodying features of the present invention.
Figures 2, 2A:
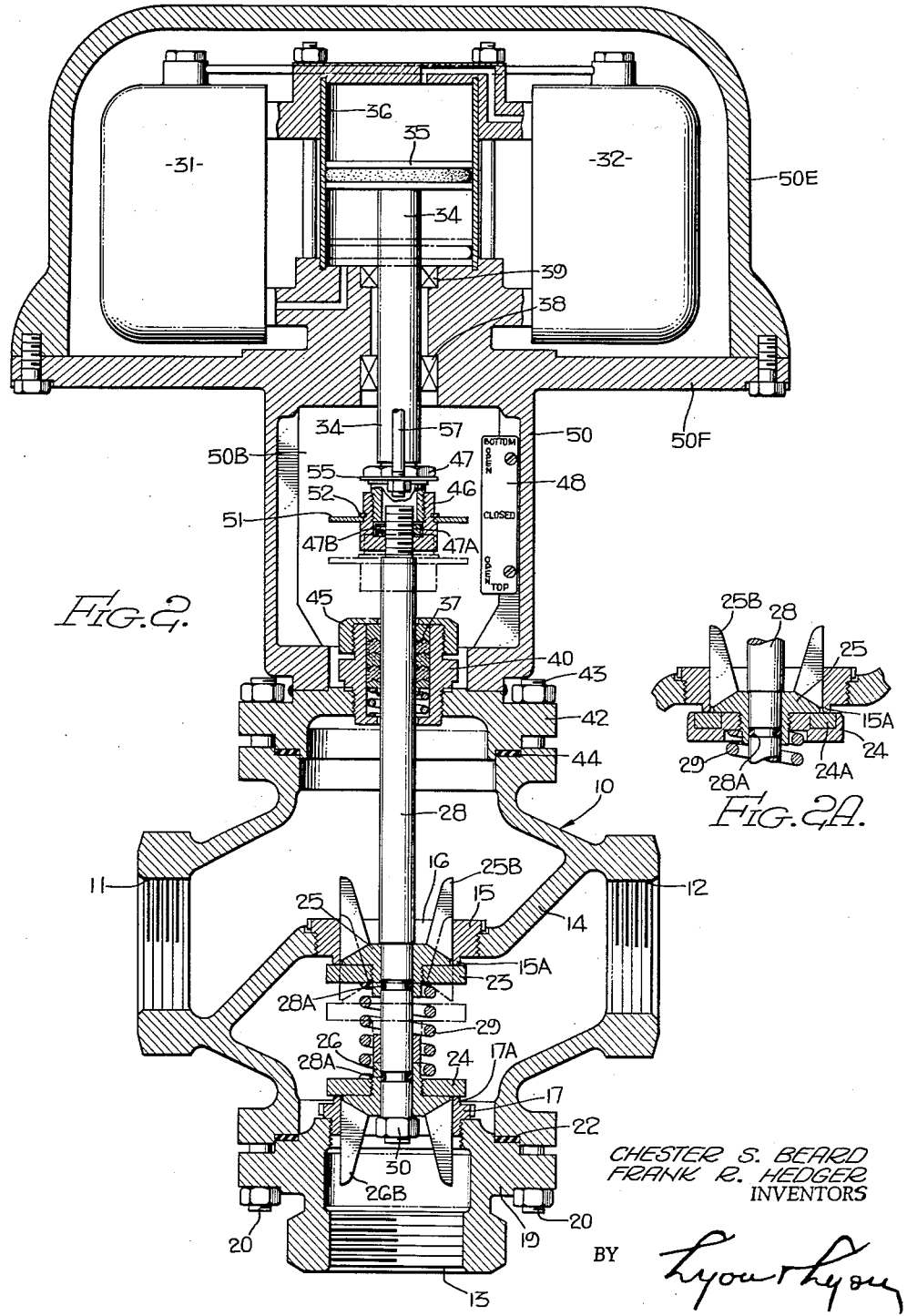
FIGURE 2 is a sectional view taken substantially on the line 2—2 of FIGURE 1.
FIGURE 2A illustrates a modification.
Figure 4:
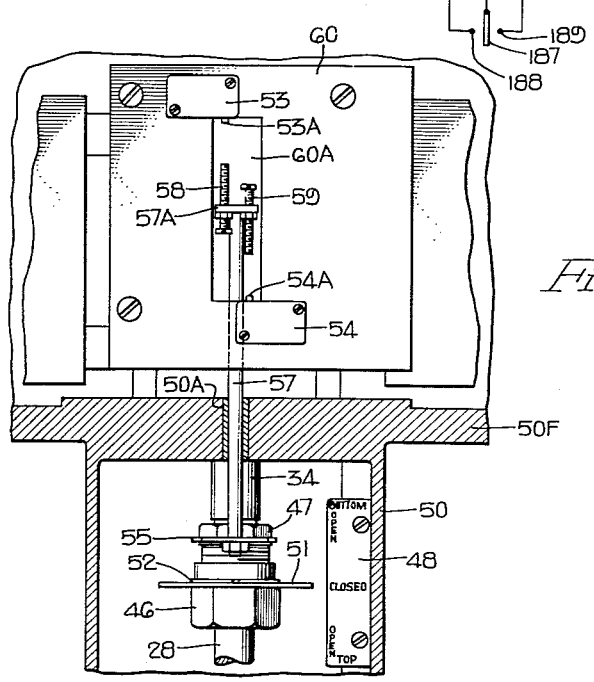
FIGURE 4 is a view in elevation, partly in section, illustrating the manner in which the limit switches indicated in FIGURE 3 are mounted in the structure shown in FIGURE 2.

Referring to the structural representations illustrated in FIGURES 1, 2 and 4 and the corresponding representation shown in FIGURE 3, the valve arrangement includes a valve casing 10 having two axially aligned and threaded openings 11 and 12 and a third threaded opening 13 having its axis extending perpendicular to the common axis of openings 11 and 12. An angled partition 14 within the casing 10 has screw-threadedly received therein a disc 15 which serves as a valve seat and defines the opening 16 through which the openings 11 and 12 may be placed in communication.

A similar valve seat 17 generally in the form of an externally threaded disc is screw-threadedly maintained in the modified cylindrical member 19 which has formed therein the aforementioned opening 13 and which is bolted to the casing 10 by means of releasable bolts 20 with a sealing ring 22 between the casing 10 and member 19.

These two ports 15 and 17 are axially aligned and each have a corresponding annular raised portion or bead 15A and 17A which are engaged respectively by the valve closure members 23 and 24 respectively.

These valve closure members 23 and 24 comprise internally threaded discs which are threaded respectively on modified sleeve elements 25 and 26 respectively, both of which are slidably mounted on the common valve stem 28 which passes through aligned apertured portions of these members 25 and 26 as well as the prestressed coil compression spring 29, the lower end of stem 28 having threaded thereon a nut 30 for retaining the assembly 25, 29 and 26 between the nut 30 and the shouldered portion 28 of stem 28 which engages a portion of the sleeve member 25.

It will be seen from this construction that the prestressed compression spring 29 constantly urges the valve closure members 23 and 24 against their corresponding valve seats 15A and 17A to thereby normally prevent any flow through the casing of the three-way valve.

It will be seen more clearly from the following description that when the valve stem 28 in FIGURE 2 is moved upwardly, the closure member 24 is raised from its seat 17A to thereby open such valve 24, 17A, while the other valve 23, 15A remains closed. In the same manner, when the valve stem 28 is pushed downwardly, the movable valve element 23 leaves its seat 15A and the valve 23, 15A is opened while the other valve 24, 17A remains closed.

It will be obvious that when this valve 23, 15A is opened, a fluid passage is provided between the openings 11 and 12; and similarly, when the valve 24, 17A is opened, a fluid passage is provided between the openings 12 and 13.

It will also be observed that when the valve element 23 is moved from its seat, the same is guided in its movement by circumferentially spaced ribs 25B slidably engaging the inner surface of the valve disc 15; and likewise, movement of valve element 24 is guided by the sliding engagement between the ribs 26B on sleeve element 26 with the inner surface of the sleeve element 17.

The particular mechanism whereby this valve stem 28 is moved either up or down to achieve the abovementioned valve openings is now described. The actuating mechanism, in general, incorporates two motor operated hydraulic systems confined in corresponding hydraulically sealed housings 31 and 32. In general, the motor operated hydraulic systems in each of the housings 31 and 32 are substantially identical with one serving to move the stem 28 in one direction and the other serving to move the stem 28 in the opposite direction. For these purposes the stem 28 is suitably connected to the shaft 34 of piston 35 which is slidably mounted within the hydraulic cylinder 36.

The piston 35 is connected to the stem 28 as illustrated in FIGURE 2, the stem 28 being slidably mounted within a conventional sealing structure 37 and the shaft 34 being slidably mounted within the sealing structures 38, 39. This sealing structure 37 comprises an outer modified sleeve element 40 which is threadedly received in a disc member 42 which in turn is bolted to the casing 10 by bolts 43 with a sealing ring 44 disposed between the casing 10 and the member 42. The degree of tightness of such sealing structure 42 may be adjusted by the position of the threaded retaining cap 45 on the sleeve element 40.

Suitable means may be provided for interconnecting the stem 28 and shaft 34 for joint movement and as illustrated herein, such means comprises a special form of nut 46 having an internally threaded portion which threadedly receives a threaded extension 47 of rod 34. A nut 47A is threaded on the stem 28, being retained thereon by set screw 47B.

In order to provide visual indication of the position of the stem 28 and hence the condition of the valve, suitable visual indicating means are provided. Such means, as illustrated, includes the printed rectangular plate 48 mounted within and on a hollow portion of the upper casing member 50 with suitable indicia on such plate 48 cooperating with a pointer 51 in the form of a ring secured on the nut 46 by the retaining ring 52. As shown in FIGURE 2, such pointer or disc 51 is adjacent the indicia "Closed" indicating that both valves 15A, 23 and 17A, 24 are closed. Such plate 48 includes also the indicia "Bottom Open" for indicating that the bottom valve 17A, 24 is open when such pointer 51 is adjacent this last-mentioned indicia. Likewise, the lower portion of plate 48 carries the indicia "Top Open."

It will also be seen in FIGURE 4 that a pair of microswitches 53 and 54 is operated when the pointer 51 is adjacent the word "Bottom" and "Top" respectively. For these purposes the extension 47 is provided with a flanged portion 55 which may take the form of a ring secured to such extension 47 by a retaining ring. A threaded shaft 57 has its lower end suitably secured to such flange or ring 55 and is slidably mounted in the apertured portion 50A of casing 50; and the upper end of such shaft or rod 57 carries a pair of adjustably positioned bolts 58 and 59 which serve respectively as actuating members for the corresponding switch elements 53A and 54A.

In order to allow visual observation and convenient adjustment, it will be seen in connection with FIGURES 1, 2 and 4 that the casing 50 is provided with a suitable hollow portion 50B which is sufficiently enlarged to allow adjustment of the packing nut 45, to allow convenient attachment and detachment of the stem 28 with respect to rod 34 and to allow visual observation of the position of the stem with respect to the printed plate 48. Also, to allow convenient adjustment of the switch actuating mechanism illustrated in FIGURE 4, these switches 53 and 54 are mounted on a plate 60 which is releasably secured to the casing 50 and which is provided with an apertured portion 60A through which an extension 57A of the rod 57 extends. Mounted on such extension 57A are the two previously mentioned adjustable switch actuating members 58 and 59.

Suitable means are provided for fastening the upper casing member 50 with respect to the stationary valve member 42, and the same may comprise simply fastening bolts securing these two elements 50 and 42 together or in some cases it may be desired to simply bond the two together by welding or brazing.

For convenient assembly and servicing the apertured portion of valve casing 10, which is normally closed by releasably mounted closure member 42, is made sufficiently large to permit complete withdrawal of the valve seats 15 and 17. It should be clear that the wearable parts of the valve may be conveniently removed, serviced and replaced by releasing the releasable connection between the stem 28 and piston 34 and also upon removing the upper part of the casing which includes the closure member 42 and casing 50.

The hydraulic system for operating the valve stem 28 is now described in detail. It will be noted that the system includes two essentially identical motor-driven pumping and valving arrangements and for purposes of facilitating description, only one of such arrangements, i.e. the arrangement illustrated within casing 31 in FIGURE 3, is described in detail; and it will be understood that corresponding elements in the other casing 32 have the same reference numerals but with the letter "A" appended thereto.

Thus, following this nomenclature, the lefthand casing 31 in FIGURE 3 incorporates a motor 70 having its rotatable shaft 71 connected through an eccentric 72 to a piston 73 slidably mounted in the cylinder 74 in housing 75. It will be understood that the housing 31 is filled with suitable fluid such as oil and that the two housings 31 and 32 are intercommunicated by a tube 76. A spring-biased check valve 77 is moved to its open position against the action of spring 78 when and as pressure is developed within the cylinder 74 by piston 73. This fluid under pressure is thus pumped from the cylinder 74 past the check valve 77 and through the conduit 79 into the lower portion of the work cylinder 36. To provide satisfactory pumping action, a spring-biased check valve 80 is opened on the suction stroke of piston 73 to allow fluid to be drawn into the cylinder 74 from the casing 31. The motor-pump arrangements in casings 31 and 32 are both electrically and hydraulically interlocked using for that purpose a normally open valve 82 which is operated to closed position by a solenoid 83 and for assuring proper operation the pressure-sensitive check valve 84 is provided.

The electrical connections in FIGURE 3 are briefly as follows. A source of energizing voltage 85 has one of its terminals connected to a common lead 86 and the other terminal of source 85 is connected to the movable arm 87 of a switch which is essentially a single-pole double-throw switch having the stationary contacts 88 and 89. This common lead 86 is connected to one terminal of solenoid 83, motor 70 and corresponding motor 70A and solenoid 83A. The other terminals of motor 70 and solenoid 83 are connected through the normally closed microswitch 53 to the stationary contact 88; and similarly, the other terminals of motor 70A and solenoid 83A are each connected through the normally closed microswitch 54 to the other stationary switch contact 89. Thus, when the switch arm 87 is moved into engagment with the stationary contact 88, the solenoid 83 and motor 70 are both energized as long as the microswitch 53 is in its normally closed position. Thus, the pump comprising piston 73 and cylinder 74 is operated and fluid is pumped from the cylinder 74 through conduit 79 into the lower portion of the work cylinder 36. In order to assure maintenance of such pressure in the work cylinder, the normally open valve 82 is maintained in its closed position by solenoid 83 which attracts the pivoted magnetizable arm 92 having its free end engageable with an extension of the movable spring-biased valve closure member 93. Such closure member 93 cooperates with the ports 94 to close the valve 82 when the solenoid 83 is energized. Such pumping action continues until the piston rod 34 and attached valve stem 28 moves upwardly to a position where the switch actuating member 58 engages and actuates the switch actuating member 53A at which time the switch 53 is opened and the motor 70 and solenoid 83 are then deenergized. During such upward movement of the piston 35, fluid is displaced in the upper portion of cylinder 36 and such fluid thus displaced flows through the conduit 79A and valve 82A which is, of course, open at this time. The fluid flowing through such valve 82 enters the interior of the casing 32 and may flow back to the interior of the other casing 31 through conduit 76.

It will be noted, then, in FIGURE 3 the switches 53 and 54 serve essentially as limit switches and their functioning produces the same results as if there were a failure in the power source represented by the battery 85. Upon operation of any one of the switches 53, 54 or upon power failure, it will be seen that the two valve ports 15A and 17A are automatically closed by the coil compression spring 29. This is so since under these conditions the piston 35 is free to move in its cylinder 36, the upper part of cylinder 36 being in communication with the oil reservoir within casing 32 through the normally open valve 82A and likewise the lower portion of the cylinder 36 is in communication with the oil reservoir within the casing 31 through the normally open valve 82. In this respect it is observed that any time the piston 35 is moved from its central position illustrated in FIGURES 2 and 3, the coil spring 29 is further compressed and the energy stored therein is used to return the movable valve member 23 or 24, as the case may be, to its closed position when either switch 53 or 54 is operated or if there is a failure in the power source 85.

Figure 5:
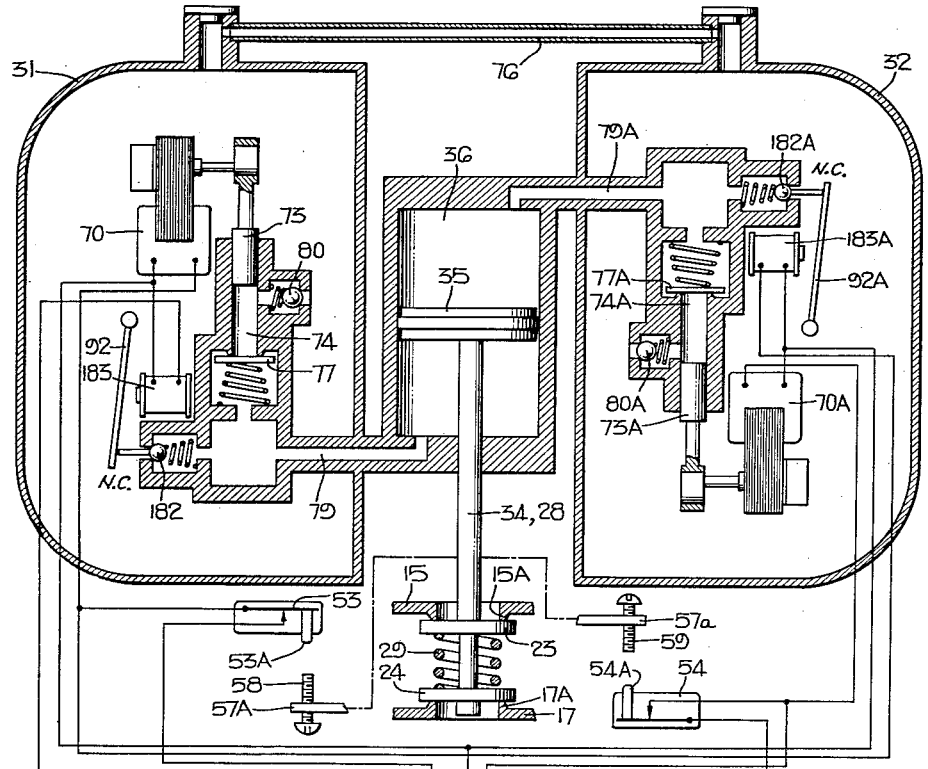
FIGURE 5 is another diagrammatic representation of a system embodying features of the present invention and constituting a modification of the system illustrated in FIGURE 3.

In the modification shown in FIGURE 5 parts identical with those in FIGURES 2 and 3 have the same reference numerals and similar or modified parts have the same reference numerals as in FIGURE 3 but such reference numerals are raised by 100.

Comparing FIGURES 3 and 5, it is noted that there are essentially only the following differences. The normally open valves 82 and 82A in FIGURE 3 now find their counterpart as normally closed valves 182 and 182A in FIGURE 5. The valves 84 and 84A shown in FIGURE 3 are omitted in FIGURE 5. Another change involves the electrical connection of the solenoids 183 and 183A in FIGURE 5 compared to the electrical connections of corresponding solenoids 83 and 83A in FIGURE 3.

In FIGURE 5 one terminal of the power source 85 is connected to one terminal of each of the following: motor 70, solenoid 183, motor 70A and solenoid 183A. The other terminal of source 85 is connected to the movable switch contact arm 187 arranged to be moved into engagement with the stationary switch contacts 188 and 189. The contact 188 is connected to the other terminal of solenoid 183A and is also connected through the normally closed switch 53 to the other terminal of motor 70. Similarly, the switch contact 189 is connected to the other terminal of the solenoid 183 and also through normally closed switch 54 to the other terminal of motor 70A. This means that when the contacts 187, 188 are engaged, both the motor 70 and the solenoid 183A are energized; and when the switch contacts 187 and 189 are energized, the motor 70A and solenoid 183 are both energized.

When solenoid 183 is energized, the pivoted armature 92 is attracted to cause the spring-biased valve 182 to open; and similarly, when the solenoid 183A is energized, the armature 92A is pivoted to cause the valve 182A to open.

In operation of the arrangement shown in FIGURE 5, assuming initially that the piston 35 is in its central position illustrated, corresponding to the closed condition of the valves 15A, 23 and 17A, 24, closing of switch 188 results in energizing of motor 70 and the solenoid 183A, in which case the hydraulic pump unit within casing 31 is operated and the normally closed valve 182A in casing 32 is open to permit fluid flow in the following path. Such fluid is pumped by piston 73 from cylinder 74 and the check valve 77, and through conduit 79 to the lower portion of cylinder 36, it being noted that at this time the valve 182 is in its normally closed condition. The fluid in the upper part of chamber 36 is displaced by the piston 35 and the displaced fluid flows through the conduit 79A and through the valve 182A which is now held open by the solenoid 183A. Thus, the piston 35 is moved upwardly and the valve 24, 17A is open to various degrees depending upon the particular position of the piston 35. Continued movement of the piston 35 upwardly, carrying with it the switch actuating member 58, results in opening of the switch 53 and consequent de-energization of the pump motor 70; however, the solenoid 183A remains energized to continue to maintain the valve 182A open. The energy stored in the spring 29 during the open movement of the valve 24, 17A, however, is not effective to return the piston 35 to its downward position since the movement of piston 35 is blocked by the pressure built by valves 182 and 77 which at this time are closed. Consequently, the valve 24, 17A remains in its open position after the switch 53 is open. Similarly, it can be demonstrated that when the switch 187, 189 is closed for a prolonged period sufficient to cause the switch 54 to be opened, the valve 15A, 23 is maintained in its fully open position with the valve 182 open but with the valve 182A closed. Also, it will be seen that when either the valve 15A, 23 or the valve 17A, 24 is thus opened and there is a failure in power source 85, the piston 35 will be locked in the position it was in at the time of power failure since the fluid on opposite sides of the piston 35 is prevented from escaping.

Referring again to FIGURE 3, it is noted that one of the functions of the check valve 84, and correspondingly 84A, is to prevent any tendency for cavitation effects to be developed behind the moving piston 35. Thus, for example, when the piston 35 is moved upwardly and there should be some cavitation effect, the valve 84 is automatically opened to allow fluid to flow behind the moving piston 35.

It is understood, of course, that the pump motor exemplified by the motor 70 in FIGURE 3 is operatively connected to the piston 73 for achieving the above described functions and results and it will be understood that the piston 73 is connected to the eccentric 72 mounted on shaft 71 through suitable rotating connections which may include a knuckle joint between the eccentric crank arm and the piston 73, all as is, of course, well understood in the art.

Referring to the modification shown in FIGURE 2A, the valve structure is substantially identical with that illustrated in FIGURE 2 and like parts have identical reference numerals, it being noted that the only essential difference is that instead of the valve element 23 (and correspondingly the valve element 24) being of solid metal as illustrated in FIGURE 2, a ring gasket 24A of suitable resilient or elastic material is recessed in an annular groove in valve element 24 and such gasket material 24A now contacts the valve seat 15A. In each case there is a suitable seal provided between the valve stem 23 and the elements 25 and 27 slidably mounted on the same. Such seal is illustrated herein as a pair of O-rings 28A disposed in spaced grooves in the valve stem 23.

As illustrated, the units 31 and 32 may be enclosed by the cover member 50E bolted to the flange 50F.

It will be understood that the invention in its broader aspects is not limited to the use of the particular three-way valve shown but, indeed, the same is particularly useful for positioning and maintaining the position of other control elements, either of the mechanical, electrical or hydraulic type. The invention is particularly useful with valves such as butterfly valves that have a tendency to change their positions due to unbalanced forces, either static or dynamic.

It will also be evident that the arrangements described are readily adaptable to proportioning automatic control devices and, indeed, the switches shown may be readily controlled to open valves to any particular degree and to maintain the same as dictated by a controller operating such switches.

While the particular embodiments of the present invention have been shown and described, it will be obvious to those skilled in the art that changes and modifications may be made without departing from this invention in its broader aspects and, therefore, the air in the appended claim is to cover all such changes and modifications as fall within the true spirit and scope of this invention.

We claim:

In an arrangement of the character described, control means; a double-acting piston; a work cylinder in which said piston moves; means connecting said piston to said control means to operate the same in accordance with movement of said piston; a first electrically operated pump means for pumping fluid into a first end of said cylinder to apply fluid pressure to a first side of said piston; a second electrically operated pump means for pumping fluid into a second end of said cylinder to apply fluid pressure to a second side of said piston; said first and second pump means each having a fluid inlet and a fluid outlet; a fluid reservoir in communication with each of said inlets; a first passageway communicating the outlet of said first pump means with said first end of said cylinder; a second passageway communicating the outlet of said second pump means with said second end of said cylinder; first solenoid valve means controlling fluid flow between said first passageway and said reservoir; second solenoid valve means controlling fluid flow between said second passageway and said reservoir; means electrically interconnecting one of said pump means and one of said solenoid valve means in a first energizing circuit such that when said first energizing circuit is energized said one pump means and said other solenoid valve means are operated simultaneously to produce movement of said piston and operation of said control means; means electrically interconnecting the other of said pump means and the other of said solenoid valve means such that when said second energizing circuit is energized said other pump means and said other solenoid valve means are operated simultaneously to produce movement of said piston and said control means, said first pump means and said first solenoid valve means being in a first fluid container; said second pump means and said second solenoid valve means being in a second fluid container; and means to interconnect said first and second containers.

References Cited in the file of this patent
UNITED STATES PATENTS

| | | |
|---|---|---|
| 962,516 | Mueller | June 28, 1910 |
| 1,616,841 | Beebe | Feb. 8, 1927 |
| 2,356,597 | Kromenberger | Aug. 22, 1944 |
| 2,372,311 | Brown | Mar. 27, 1945 |
| 2,509,321 | Topanelian | May 30, 1950 |
| 2,561,786 | Davis | July 24, 1951 |
| 2,676,462 | Berry | Apr. 27, 1954 |
| 2,679,727 | McLeod | June 1, 1954 |
| 2,877,798 | Hansen | Mar. 17, 1959 |
| 2,942,581 | Gaffney | June 28, 1960 |
| 3,018,797 | Parks | June 30, 1962 |